(12) United States Patent
Smith

(10) Patent No.: US 7,016,394 B2
(45) Date of Patent: Mar. 21, 2006

(54) MALE-FEMALE ELECTRODE JOINT

(75) Inventor: Robert E. Smith, Strongsville, OH (US)

(73) Assignee: Ucar Carbon Company Inc., Parma, OH (US)

(*) Notice: Subject to any disclaimer, the term of this patent is extended or adjusted under 35 U.S.C. 154(b) by 0 days.

(21) Appl. No.: 10/830,618

(22) Filed: Apr. 23, 2004

(65) Prior Publication Data

US 2005/0249260 A1 Nov. 10, 2005

(51) Int. Cl.
*H05B 7/06* (2006.01)
(52) U.S. Cl. .............................. 373/88; 373/89; 373/92
(58) Field of Classification Search ................. 373/60, 373/88–92, 97–98; 403/DIG. 5, 267, 296
See application file for complete search history.

(56) References Cited

U.S. PATENT DOCUMENTS

| | | | | |
|---|---|---|---|---|
| 4,290,709 A | | 9/1981 | Seldin et al. ............... | 403/296 |
| 4,495,624 A | * | 1/1985 | Reimpell et al. ............. | 373/93 |
| 4,629,280 A | * | 12/1986 | Semmler et al. ............. | 439/87 |
| 5,870,424 A | * | 2/1999 | Todoriki et al. ............. | 373/92 |

OTHER PUBLICATIONS

National Electrical Manufacturers Association (NEMA) Standards Publication CG 1-2001, Manufactured Graphite/Carbon Electrodes (2002).
International Electrotechnical Commission (IEC), International Standard, Third Edition, May 1997.
Japan Standards Association (JSA), Japanese Industrial Standard JIS R 7201: 1997, Cylindrical Machined Graphite Electrodes (1998).
Joo and Lewallen, "Unitrode Joints for Arc Furnace Electrodes," 3rd Arc Furnace Meeting, 1981.
Moncrief and Salomon, "Electrode Properties/Specification—Their Real Value", 8th Polish Electrode Symposium, 1984 (abstracts only).
Treugut and LeFrank, "Profiling and Loading Capacity of the Nipple-Case-Union Graphite Electrodes; Theoretical Considerations and Application Technological Study in an Electric Steel Furnace," Fachber.Huttenprax.Metall., 19:42-47 (No. 1, 1981) (abstract only).

* cited by examiner

*Primary Examiner*—Tu Hoang
(74) *Attorney, Agent, or Firm*—Waddey & Patterson, P.C.; James R. Cartiglia

(57) ABSTRACT

A graphite electrode joint, where the male tang has a tang factor, defined as the ratio of male tang length to electrode diameter, of at least about 0.60.

5 Claims, 1 Drawing Sheet

MALE-FEMALE ELECTRODE JOINT

BACKGROUND OF THE INVENTION

1. Technical Field

The present invention relates to the male tang used to join graphite electrodes, and especially to a male-female joint for graphite electrodes. More particularly, the invention concerns a unique design for a male-female electrode joint, and the electrodes from which the joint is formed.

2. Background Art

Graphite electrodes are used in the steel industry to melt the metals and other ingredients used to form steel in electrothermal furnaces. The heat needed to melt metals is generated by passing current through one or a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Conventionally, electrodes are joined into columns via a pin (sometimes referred to as a nipple) that functions to join the ends of adjoining electrodes. Typically, the pin takes the form of opposed male threaded sections or tangs, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Alternatively, it has in the past been suggested that the electrodes be formed with a male threaded protrusion or tang machined into one end and a female threaded socket machined into the other end, such that the electrodes can be joined by threading the male tang of one electrode into the female socket of a second electrode, and thus form an electrode column. The joined ends of two adjoining electrodes in such an embodiment is referred to in the art as a male-female joint.

Given the extreme thermal stress that the electrode and the joint (and indeed the electrode column as a whole) undergoes, mechanical/thermal factors such as strength, thermal expansion, and crack resistance must be carefully balanced to avoid damage or destruction of the electrode column or individual electrodes. For instance, longitudinal (i.e., along the length of the electrode/electrode column) thermal expansion of the electrodes, especially at a rate different than that of the pin, can force the joint apart, reducing effectiveness of the electrode column in conducting the electrical current. A certain amount of transverse (i.e., across the diameter of the electrode/electrode column) thermal expansion of the pin in excess of that of the electrode may be desirable to form a firm connection between pin and electrode; however, if the transverse thermal expansion of the pin greatly exceeds that of the electrode, damage to the electrode or separation of the joint may result. Again, this can result in reduced effectiveness of the electrode column, or even destruction of the column if the damage is so severe that the electrode column fails at the joint section. Thus, control of the thermal expansion of an electrode, in both the longitudinal and transverse directions, is of paramount importance.

As a consequence, if the pin can be eliminated from the electrode/electrode column system, the need to balance the thermal expansion of the different system components (i.e., pin and electrode) is reduced. Prior attempts to eliminate the pin have been attempted, where a threaded electrode end or other electrode mating means have been employed. Industry acceptance has lagged, however, since it is felt that the strength of the joint is not sufficient to maintain the integrity of the electrode column without a pin.

What is desired, therefore, is a male-female electrode joint having sufficient strength and integrity to permit elimination of the pin, without a significant reduction in electrode performance. It is also highly desirable to achieve these property benefits without using high quantities of expensive materials.

SUMMARY OF THE INVENTION

It is an aspect of the present invention to provide a male-female joint for graphite electrodes.

It is another aspect of the present invention to provide a male-female joint for graphite electrodes which is designed to better withstand the thermal and mechanical stress on an electrode column in use, as compared to prior male-female graphite electrode joints.

It is yet another aspect of the present invention to provide a male-female joint for graphite electrodes which produces electrode column joints having improved strength and stability.

Still another aspect of the present invention is a graphite electrode joint, having improved resistance to stub loss, defined as the loss of the part of the electrode column lying from the arc tip to and sometimes including the joint closest to the arc tip, as compared to art-conventional graphite electrode joints which employ pins.

These aspects and others that will become apparent to the artisan upon review of the following description can be accomplished by providing a graphite electrode for use in a male-female electrode joint, the electrode having a male tang having a ratio of male tang length to diameter of the electrode of at least about 0.60. In the preferred embodiment of the application, the ratio of the diameter of the male tang to the length of the male tang should be no more than about 2.5 times the ratio of the length of the male tang to the diameter of the electrode when the ratio of the length of the male tang to the electrode diameter is about 0.60. Indeed, the ratio of the diameter of the male tang at its base to the male tang length should vary with the ratio of male tang length to electrode diameter such that for every 0.01 higher than 0.60 the ratio of male tang length to electrode diameter is, the ratio of the diameter of the male tang at its base to the male tang length should be about 0.016 lower.

The inventive graphite electrode, when having a ratio of male tang length to electrode diameter of 0.85 or lower, should preferably also have a ratio of the taper of the male tang, expressed in degrees, to the ratio of male tang length to electrode diameter of at least about 15. Moreover, the ratio of the taper of the male tang to the ratio of male tang length to electrode diameter varies with the ratio of male tang length to electrode diameter such that for every 0.01 lower than 0.85 the ratio of male tang length to electrode diameter is, the ratio of the taper of the male tang to the ratio of male tang length to electrode diameter should be about 1.25 higher.

The invention also includes an electrode joint formed from the inventive graphite electrode and a second graphite electrode having a female threaded socket, wherein the male threaded tang engages the female threaded socket to form the joint.

A process for preparing the inventive graphite electrode is also presented, including mixing coke and a pitch binder, to form a stock blend; extruding the stock blend to form a green stock; baking the green stock to form a carbonized stock; graphitizing the carbonized stock by maintaining the carbonized stock at a temperature of at least about 2500° C. to form a graphitized stock; and machining the graphitized stock so as to form a male tang having a ratio of male tang length to diameter of the graphitized stock of at least about 0.60.

It is to be understood that both the foregoing general description and the following detailed description provide embodiments of the invention and are intended to provide an overview or framework of understanding to nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

DETAILED DESCRIPTION OF THE PREFERRED EMBODIMENT

Figure 1:
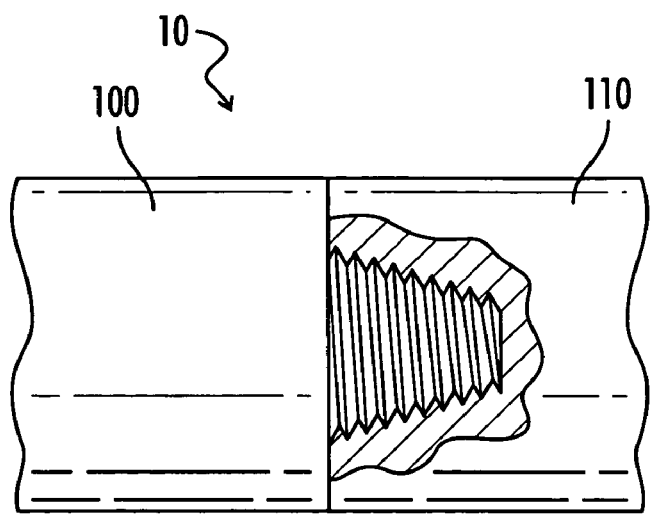
FIG. 1 is a partial side cross-sectional view of a male-female graphite electrode joint in accordance with the present invention.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, particles up to about 25 millimeters (mm) in average diameter are employed in the blend. The particulate fraction preferable includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

Most preferably, the carbon fibers (when used) are preferably present at a level of about 0.5 to about 6 parts by weight of carbon fibers per 100 parts by weight of calcined coke, or at about 0.4% to about 5.5% by weight of the total mix components (excluding binder). The preferred fibers have an average diameter of about 6 to about 15 microns, and a length of preferably about 4 mm to about 25 mm, and most preferably less than about 32 mm. The carbon fibers used in the inventive process should preferably have a tensile strength of at least about 150,000 psi. Most advantageously, the carbon fibers are added to the stock blend as bundles, each bundle containing from about 2000 to about 20,000 fibers.

Preferably, the fibers are added after mixing of the particulate fraction and pitch has already begun. Indeed, in a more preferred embodiment, the fibers are added after at least about half the mix cycle has been completed, most preferably after at least about three-quarters of the mix cycle has been completed. For instance, if the mixing of the particulate fraction and pitch takes two hours (i.e., a mix cycle is two hours), the fibers should be added after one hour, or even ninety minutes, of mixing. Adding the fibers after the mixing has begun will help preserve fiber length (which can be reduced during the mixing process) and thereby the beneficial effects of the inclusion of fibers, which are believed to be directly related to fiber length.

As noted above, the particulate fraction can include small particle size filler (small is used herein as compared to the particle size of the calcined coke, which generally has a diameter such that a major fraction of it passes through a 25 mm mesh screen but not a 0.25 mm mesh screen, and as compared to the fillers conventionally employed). More specifically, the small particle size filler comprises at least about 75% coke powder, by which is meant coke having a diameter such that at least about 70% and more advantageously up to about 90%, will pass through a 200 Tyler mesh screen, equivalent to 74 microns.

The small particle size filler can further comprise at least about 0.5% and up to about 25% of other additives like a puffing inhibitor such as iron oxide. Again, the additive should also be employed at a particle size smaller than that conventionally used. For instance, when iron oxide is included, the average diameter of the iron oxide particles should be such that they are smaller than about 10 microns. Another additional additive which can be employed is petroleum coke powder, having an average diameter such that they are smaller than about 10 microns, added to fill porosity of the article and thus enable better control of the amount of pitch binder used. The small particle size filler should comprise at least about 30%, and as high as about 50% or even 65% of the particulate fraction.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 700 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours. Once graphitization is completed, the finished article can be cut to size and then machined or otherwise formed into its final configuration.

In order to provide a male-female electrode joint having improved stability in the furnace, the male tang (and, by extension, the female socket) must be dimensioned such that the tang will provide the required strength in use. In order to do so, a balancing must be accomplished. More particularly, it is now been discovered that the ratio of the length of the male tang to the diameter of the electrode (referred to herein as the tang factor) is important in optimizing the performance of a male-female electrode joint. More specifically, a tang factor of at least about 0.60 is believed to be important in creating a male-female electrode joint having improved stability and commercially acceptable performance.

The interaction of other joint characteristics can also help optimize the electrode joint. For instance, a ratio (referred to herein as the tang diameter factor) of a factor defined by the ratio of the diameter of the male tang at its base to the male tang length can be used to provide even further enhancements to the joint. The tang diameter factor should be no greater than 2.5 times the tang factor for an especially effective joint with a tang factor of about 0.60. Indeed, the tang diameter factor should most preferably vary with the tang factor, such that when a joint with a tang factor higher than 0.60 is produced, the tang diameter factor of the joint should be lower than 2.5 times the stub factor. More specifically, for every 0.01 higher than 0.60 that the tang factor of a joint is, the maximum tang diameter factor should be about 0.016 lower. As an example, when a joint having a tang factor of 0.85 is produced, the tang diameter factor of the male tang of the joint should be lower than about 1.28 times the tang factor of the joint.

Another joint characteristic that can come into play in designing an effective male-female joint is referred to herein as the taper factor, which is defined as the ratio of the taper (expressed in degrees, and illustrated in FIG. 2 as the angle designated α) of the male tang to the tang factor. The taper factor for an effective male-female joint should be at least about 15, where the tang factor is 0.85, and should also vary as joints with different tang factors are produced. For instance, for every 0.01 lower than 0.85 that the tang factor of a joint is, the minimum taper factor should be about 1.25 higher. As an example, when a joint having a tang factor of 0.60 is produced, the taper factor of the male tang of the joint should be at least about 45.

Figure 2:
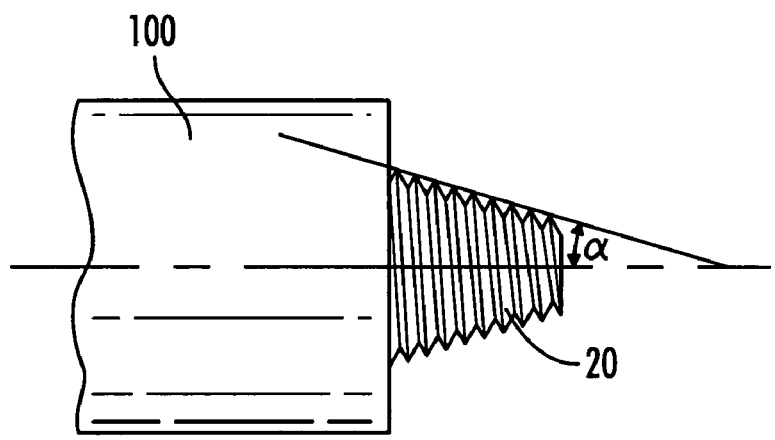
FIG. 2 is a partial side cross-sectional view of a graphite electrode having a male tang for the male-female graphite electrode joint of FIG. 1.
Figure 3:
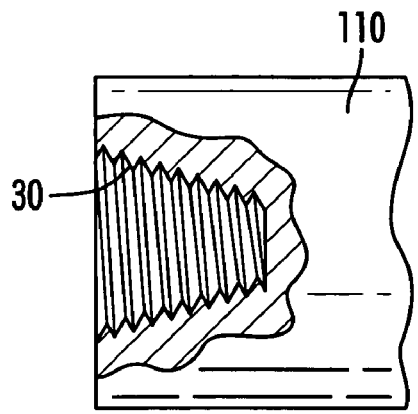
FIG. 3 is a partial side cross-sectional view of a female socket for the male-female graphite electrode joint of FIG. 1.

When employing the tang factor of at least about 0.60, and/or the tang diameter factor or taper factor of the joint as described above, a male-female joint is produced that can achieve commercial acceptability, at least in terms of joint strength and stability. A typical graphite electrode joint produced in accordance with the invention is illustrated in FIGS. 1–3 and denoted 10. Joint 10 comprises a first electrode 100 and a second electrode 110, first electrode 100 having a male tang 20 and second electrode 110 having a female socket 30. As illustrated, male tang 20 and female socket 30 cooperate to form joint 10 and thus connect first electrode 100 and second electrode 110 into a column. With proper dimensioning of male tang 20 (and corresponding dimensioning of female socket 30), an improved joint 10 is provided.

It will be recognized by the skilled artisan that the optimized male tang described hereinabove will also apply to pin-joined graphite electrodes. In other words, in a pin-joined graphite electrode joint, as opposed to a male-female joint, the pin effectively has two male tangs, in the form of the two male sections of the pin. These male tangs can also be proportioned in the manner described above to optimize the functioning of a pin-joined joint, in a similar manner as the functioning of a male-female joint is optimized.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for preparing a graphite electrode, the process comprising
    (a) mixing coke and a pitch binder, to form a stock blend;
    (b) extruding the stock blend to form a green stock;
    (c) baking the green stock to form a carbonized stock;
    (d) graphitizing the carbonized stock by maintaining the carbonized stock at a temperature of at least about 2500° C. to form a graphitized stock;
    (e) machining the graphitized stock so as to form a male tang having a ratio of male tang length to diameter of the graphitized stock of at least about 0.60.

2. The process of claim 1, wherein a ratio of the diameter of the male tang at its base to male tang length is no greater than about 2.5 times the ratio of male tang length to electrode diameter.

3. The process of claim 2, wherein the ratio of the diameter of the male tang at its base to male tang length varies with the ratio of male tang length to electrode diameter such that for every 0.01 higher than 0.60 the ratio of male tang length to electrode diameter is, the ratio of the diameter of the male tang at its base to the ratio of male tang length to electrode diameter is about 0.016 lower.

4. The process of claim 1, wherein the male tang is tapered and, for an electrode having a ratio of male tang length to electrode diameter of 0.85 or lower, the ratio of the taper of the male tang to the ratio of male tang length to electrode diameter is at least about 15.

5. The process of claim 4, wherein the ratio of the taper of the male tang to the ratio of male tang length to electrode diameter varies with the ratio of male tang length to electrode diameter such that for every 0.01 lower than 0.85 the ratio of male tang length to electrode diameter is, the ratio of the taper of the male tang to the ratio of male tang length to electrode diameter is about 1.25 higher.

* * * * *